(12) United States Patent
Takamura et al.

(10) Patent No.: US 7,766,312 B2
(45) Date of Patent: Aug. 3, 2010

(54) COIL SPRING

(75) Inventors: Noritoshi Takamura, Aikoh-gun (JP); Satoru Tendo, Aikoh-gun (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 179 days.

(21) Appl. No.: 11/921,257

(22) PCT Filed: May 31, 2006

(86) PCT No.: PCT/JP2006/310876

§ 371 (c)(1), (2), (4) Date: Nov. 29, 2007

(87) PCT Pub. No.: WO2006/129710

PCT Pub. Date: Dec. 7, 2006

(65) Prior Publication Data

US 2009/0230602 A1    Sep. 17, 2009

(30) Foreign Application Priority Data

May 31, 2005   (JP) .............................. 2005-160235

(51) Int. Cl.
*F16F 1/02* (2006.01)
(52) U.S. Cl. ........................................ 267/170; 267/179
(58) Field of Classification Search ......... 267/166–179; 123/90.65, 90.67
See application file for complete search history.

(56) References Cited

U.S. PATENT DOCUMENTS

| | | | | |
|---|---|---|---|---|
| 3,220,523 A | * | 11/1965 | Hepner | 192/81 R |
| 4,017,062 A | * | 4/1977 | Zwirner | 267/166 |
| 4,077,619 A | * | 3/1978 | Borlinghaus | 267/166.1 |
| 4,993,376 A | * | 2/1991 | Fukutome et al. | 123/90.65 |
| 5,246,215 A | * | 9/1993 | Takamura et al. | 267/170 |
| 2006/0061024 A1 | * | 3/2006 | Jung et al. | 267/167 |

FOREIGN PATENT DOCUMENTS

DE            3516626            11/1986

(Continued)

*Primary Examiner*—Christopher P Schwartz
(74) *Attorney, Agent, or Firm*—Jordan and Hamburg LLP (57) ABSTRACT

A coil spring reduces Hertzian stress on a first turn and bending stress on a coil end.

A coil end 11 is shifted in a diametral outer or inner direction of a coil spring relative to the first turn 13, to form a vertical gap between the coil end 11 and the first turn 13 in a free state without load on the coil spring. Due to the gap, the coil spring including the coil end 11 and first turn 13 can be entirely processed by shot peening as well as the remaining portion. The first turn 13 receives a combination of torsional stress and Hertzian stress (contact stress). Since the coil end 11 that receives high Hertzian stress is shifted in a diametral outer or inner direction of the coil spring relative to the first turn 13, a contact point on the first turn 13 is shifted in the diametral outer or inner direction to reduce the torsional stress on the first turn 13. The shift and gap formed between the coil end 11 and the first turn 13 are effective to prevent excessive bending stress and breakage of the coil end 11 when the coil end 11 and first turn 13 are repeatedly engaged and disengaged in the gap.

17 Claims, 8 Drawing Sheets

FOREIGN PATENT DOCUMENTS

| | | |
|---|---|---|
| JP | 1-108305 | 7/1989 |
| JP | 6-264948 | 9/1994 |
| JP | 08-074907 | 3/1996 |
| JP | 2545359 | 5/1997 |
| JP | 10-281197 | 10/1998 |
| JP | 10-299434 | 11/1998 |
| JP | 2000-274468 | 10/2000 |
| JP | 2002-257169 | 9/2002 |

* cited by examiner

| | Gap "t" (mm) | Shift "S" (mm) | Ratio of 'S' to element wire diameter | Tip thickness "T" (mm) | Ratio of 'T' to element wire diameter | Durability test result with shearing stress of 686±637 MPa | | | Remarks |
|---|---|---|---|---|---|---|---|---|---|
| | | | | | | 1 | 2 | 3 | |
| Comparative example 1 | 0.60 | 0 | 0% | 0.95 | 23.2% | 5.32.E+06 | 6.75.E+06 | 9.15.E+06 | Breakage at 1.0th to 1.1st turn |
| Comparative example 2 | 1.05 | 0 | 0% | 1.10 | 26.8% | 7.25.E+06 | 8.11.E+06 | 1.08.E+07 | Breakage at 1.0th to 1.1st turn |
| Applied example 1 | 0.20 | + 0.20 | 5% | 1.30 | 31.7% | No breakage after 9×10⁷ times of stress application | No breakage after 9×10⁷ times of stress application | No breakage after 9×10⁷ times of stress application | |
| Applied example 2 | 0.25 | + 0.15 | 4% | 1.15 | 28.0% | No breakage after 9×10⁷ times of stress application | No breakage after 9×10⁷ times of stress application | No breakage after 9×10⁷ times of stress application | |
| Applied example 3 | 0.65 | + 0.20 | 5% | 1.25 | 30.5% | No breakage after 9×10⁷ times of stress application | No breakage after 9×10⁷ times of stress application | No breakage after 9×10⁷ times of stress application | |
| Applied example 4 | 0.55 | + 0.25 | 6% | 1.40 | 34.1% | No breakage after 9×10⁷ times of stress application | No breakage after 9×10⁷ times of stress application | No breakage after 9×10⁷ times of stress application | |
| Applied example 5 | 1.05 | + 0.45 | 11% | 1.20 | 29.3% | No breakage after 9×10⁷ times of stress application | No breakage after 9×10⁷ times of stress application | No breakage after 9×10⁷ times of stress application | |
| Applied example 6 | 1.10 | − 0.55 | −13% | 1.07 | 26.1% | No breakage after 9×10⁷ times of stress application | No breakage after 9×10⁷ times of stress application | No breakage after 9×10⁷ times of stress application | |
| Applied example 7 | 0.55 | + 1.40 | 34% | 1.25 | 30.5% | No breakage after 9×10⁷ times of stress application | No breakage after 9×10⁷ times of stress application | No breakage after 9×10⁷ times of stress application | |
| Applied example 8 | 0.60 | − 1.35 | −33% | 1.60 | 39.0% | No breakage after 9×10⁷ times of stress application | No breakage after 9×10⁷ times of stress application | No breakage after 9×10⁷ times of stress application | |
| Applied example 9 | 0.60 | + 1.55 | 38% | 1.15 | 28.0% | 3.53.E+07 | 3.98.E+07 | No breakage after 9×10⁷ times of stress application | Tip breakage at 0.15th to 0.25th turn |
| Applied example 10 | 0.65 | + 1.80 | 44% | 1.05 | 25.6% | 4.03.E+07 | No breakage after 9×10⁷ times of stress application | No breakage after 9×10⁷ times of stress application | Tip breakage at 0.15th to 0.25th turn |
| Applied example 11 | 0.60 | + 2.35 | 57% | 1.00 | 24.4% | 9.32.E+06 | 1.08.E+07 | 1.42.E+07 | Tip breakage at 0.15th to 0.3th turn |
| Applied example 12 | 0.60 | − 2.20 | −54% | 0.95 | 23.2% | 4.32.E+06 | 5.08.E+06 | 7.15.E+06 | Tip breakage at 1.0th to 1.2nd turn |
| Applied example 13 | 0.70 | − 1.70 | −41% | 1.25 | 30.5% | 1.83.E+07 | 1.91.E+07 | 3.15.E+07 | Breakage at 1.0th to 1.1st turn |
| Applied example 14 | 0.75 | + 0.25 | 6% | 2.15 | 52.4% | 5.85.E+06 | 7.15.E+06 | 8.05.E+06 | Breakage at 1.0th to 1.15th turn |
| Applied example 15 | 0.80 | − 0.60 | −15% | 2.25 | 54.9% | 2.22.E+06 | 3.75.E+06 | 7.15.E+06 | Breakage at 1.0th to 1.2nd turn |
| Applied example 16 | 0.65 | + 0.65 | 16% | 2.10 | 51.2% | 7.82.E+06 | 8.05.E+06 | 1.02.E+07 | Breakage at 1.0th to 1.1st turn |
| Applied example 17 | 0.10 | + 0.35 | 9% | 0.95 | 23.2% | 2.31.E+07 | 3.51.E+07 | No breakage after 9×10⁷ times of stress application | Breakage at 1.0th to 1.1st turn |
| Applied example 18 | 0.15 | − 0.50 | −12% | 1.15 | 28.0% | 3.61.E+07 | 4.79.E+07 | No breakage after 9×10⁷ times of stress application | Breakage at 1.0th to 1.1st turn |

Fig.10(b)

| | Gap "t" (mm) | Shift "S" (mm) | Ratio of 'S' to element wire diameter | Tip thickness "T" (mm) | Ratio of 'T' to element wire diameter | Durability test result with engine driven at high speed |
|---|---|---|---|---|---|---|
| Applied example 19 | 0.75 | + 1.10 | 27% | 0.55 | 13.4% | Tip breakage at 0.15th turn after 11 hours of test |
| Applied example 20 | 0.75 | − 0.90 | −22% | 0.50 | 12.2% | Tip breakage at 0.15th turn after 10 hours of test |
| Applied example 21 | 0.55 | + 0.75 | 18% | 0.65 | 15.9% | Tip breakage at 0.15th turn after 21 hours of test |
| Applied example 22 | 0.55 | − 0.75 | −18% | 0.65 | 15.9% | No breakage after 24 hours of test |
| Applied example 23 | 0.75 | + 0.90 | 22% | 0.75 | 18.3% | No breakage after 24 hours of test |
| Applied example 24 | 0.80 | + 0.60 | 15% | 1.20 | 29.3% | No breakage after 24 hours of test |
| Applied example 25 | 1.20 | − 0.65 | −16% | 0.95 | 23.2% | No breakage after 24 hours of test |

COIL SPRING

FIELD OF THE INVENTION

The present invention relates to a coil spring serving as, for example, a valve spring of an internal combustion engine of, for example, an automobile.

BACKGROUND OF THE INVENTION

Figure 13:
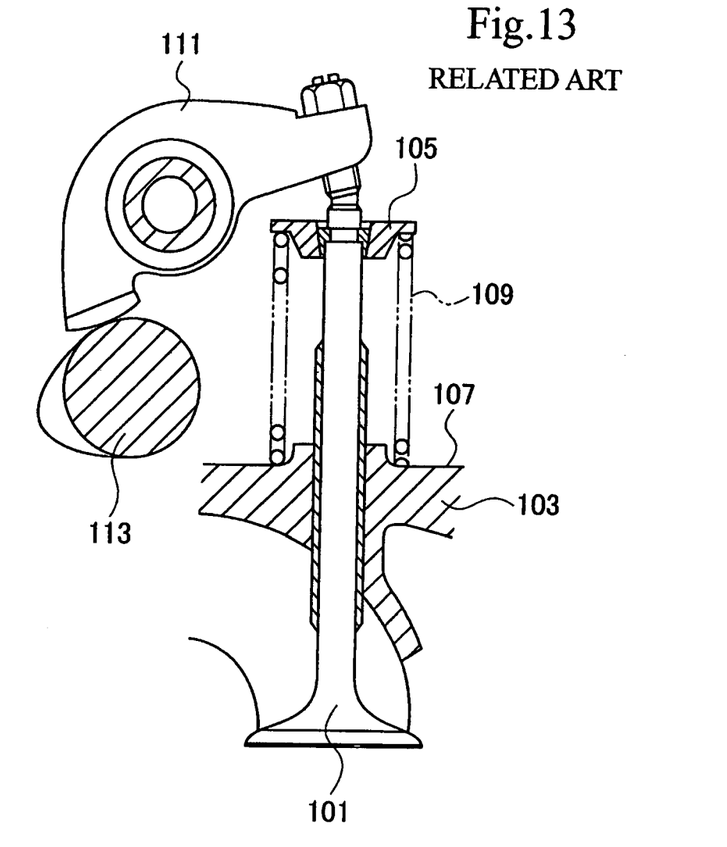
FIG. 13 It is a schematic sectional view showing a valve gear (Related art).

Conventionally, a valve spring of an internal combustion engine is attached as shown in FIG. 13, for example. FIG. 13 is a schematic sectional view showing a valve gear. In the valve gear of FIG. 13, a valve 101 is an intake valve or a discharge valve installed in a cylinder head 103 such that the valve 101 reciprocates through the cylinder head 103. A first end of the valve 101 is a spring retainer 105 serving as a movable part. The cylinder head 103 has a mounting seat 107 serving as a stationary part. Between the spring retainer 105 and the mounting seat 107, a valve spring 109 is arranged.

The first end of the valve 101 is in contact with a first end of a rocker arm 111. A second end of the rocker arm 111 is in contact with a cam shaft 113.

In response to rotation of the cam shaft 113, the rocker arm 111 rocks to make the valve 101 open and close an intake or discharge port.

At this time, the valve spring 109 applies spring force to the retainer 105 with respect to the seat 107 so that the first end of the valve 101 may surely follow the rocker arm 111.

Figure 14:
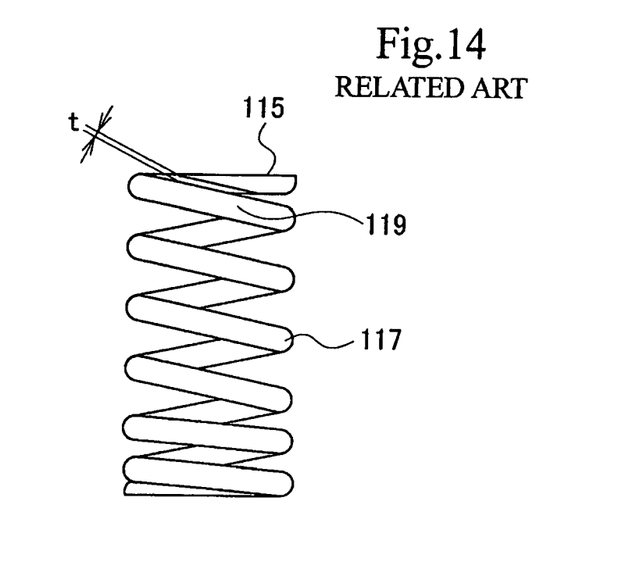
FIG. 14 It is a side view showing the valve spring (Related art).
Figure 15:
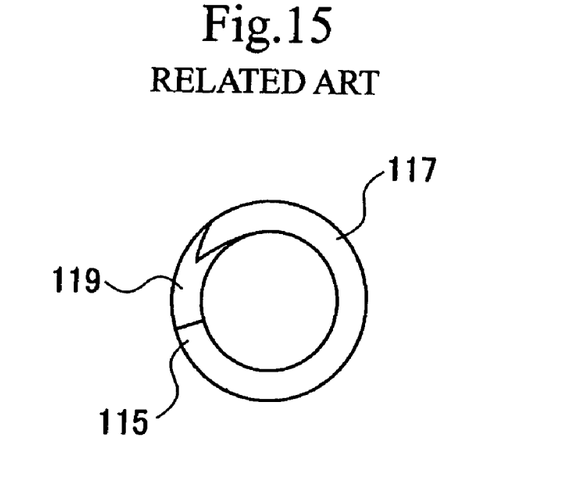
FIG. 15 It is a plan view showing the valve spring (Related art).
Figure 16:
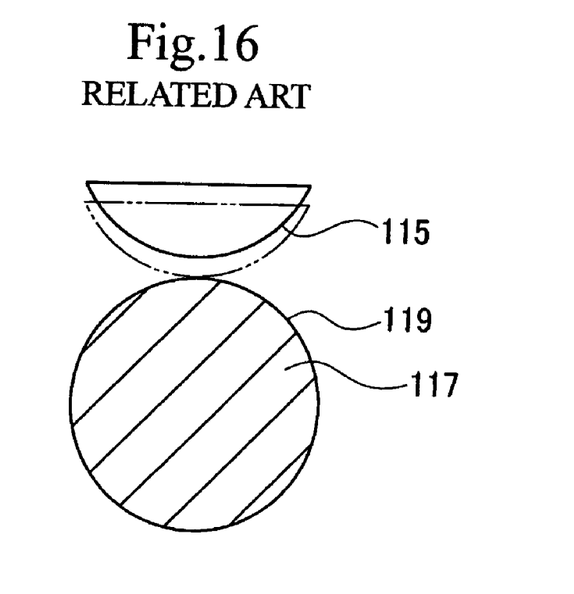
FIG. 16 It is a sectional view showing a relationship between a coil end and a first turn in connection with contact (Related art).

FIG. 14 is a side view showing the valve spring 109, FIG. 15 is a plan view showing the valve spring 109, and FIG. 16 is a sectional view showing a relationship between a coil end and a first turn of the valve spring 109.

Recent valve springs are required to have high stress and high durability. To satisfy the requirements, the valve spring 109 has a vertical gap "t" between a coil end 115 and a first turn 119 of an element wire 117. With the gap t, the coil end 115 and first turn 119 of the element wire 117 are entirely processable by shot peening, to equally improve the residual stress of the first turn 119, prevent a fretting breakage of the first turn 119, and improve the durability of the valve spring 109.

The coil end 115 and first turn 119 come in contact with each other as shown with a chain double-dashed line in FIG. 16. At this time, load in an axial direction of the valve spring 109 directly acts as bearing force between the coil end 115 and the first turn 119. This increases Hertzian stress on the first turn 119 and deteriorates the durability of the valve spring 109.

The gap t is formed by deforming the coil end 115 in an axial direction of the valve spring 109 relative to the first turn 119. When the valve 101 is operated at high speed, the coil end 115 and first turn 119 rapidly repeat engagement and disengagement in the distance of t, to apply excessive bending stress to the coil end 115. This may break the coil end 115, or may cause a tip breakage of the coil end 115.

Patent Literature 1: Japanese Utility Model Patent Publication No. 2545359

DESCRIPTION OF THE INVENTION

Problem to be Solved by the Invention

A problem to be solved by the invention is that reduction in Hertzian stress of a first turn is insufficient, improvement of durability is limited, and excessive bending stress acts on a coil end to cause a breakage of the coil end.

Means for Solving the Problem

In order to accomplish the object, the present invention is most characterized by a first end of a coiled element wire, arranged on a movable part, shifted in one of diametral inner and outer directions relative to a first turn of the element wire, to form a vertical gap between the first end and the first turn.

EFFECT OF THE INVENTION

A coil spring of the present invention is made of a coiled element wire including a first end arranged on the movable part and shifted in one of diametral inner and outer directions of the coil spring relative to a first turn of the element wire, to form a vertical gap between the first end and the first turn when the coil spring is in a free state without load. Accordingly, the gap allows the first end and first turn to be entirely processed by shot peening.

The first turn receives a combination of torsional stress and Hertzian stress. Shifting the first end, which receives high bearing force, in a diametral direction of the coil spring results in shifting a contact point of the first turn in the diametral direction and reducing the torsional stress acting on the first turn.

Load in an axial direction of the coil spring acting between the first end and the first turn of the element wire is divided into a bearing force and a sliding force between the first end and the first turn. This results in reducing the bearing force between the first end and the first turn and decreasing Hertzian stress on the first turn.

The first end is shifted from the first turn in a diametral direction of the coil spring to form a vertical gap between the first end and the first turn, so that it eliminates excessive bending stress acting on the first end to prevent the first end from breaking even if the first end and first turn repeatedly engage and disengage.

BEST MODE FOR CARRYING OUT THE INVENTION

In order to reduce Hertzian stress on a first turn and eliminate excessive bending stress on a coil end, it provides a coil spring with a coil end shifted in a diametral inner or outer direction of the coil spring relative to a first turn of the coil spring.

Embodiment 1

[Coil Spring]

Figure 1:
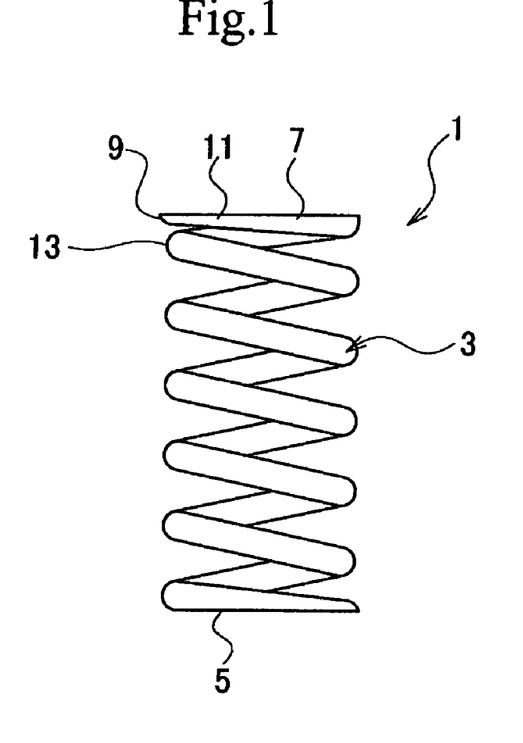
FIG. 1 It is a side view showing a valve spring (First embodiment).
Figure 2:
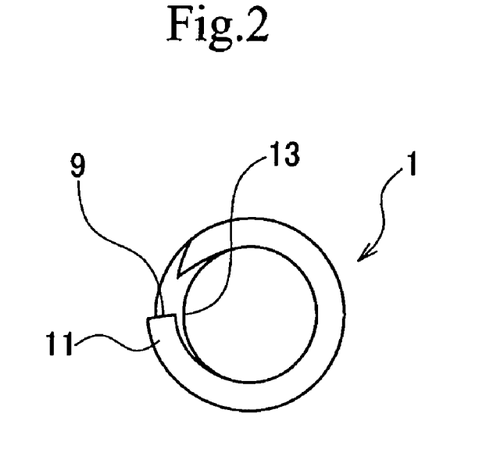
FIG. 2 It is a plan view showing the valve spring (First embodiment).
Figure 3:
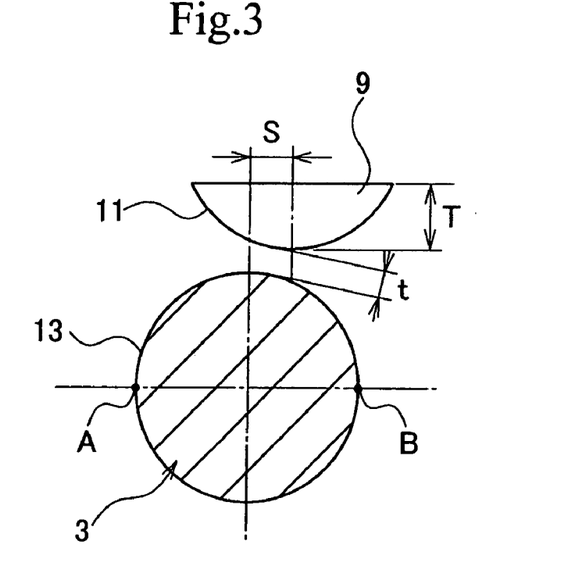
FIG. 3 It is an enlarged sectional view showing a coil end of the valve spring in connection with a first turn of an element wire in a free state (First embodiment).
Figure 4:
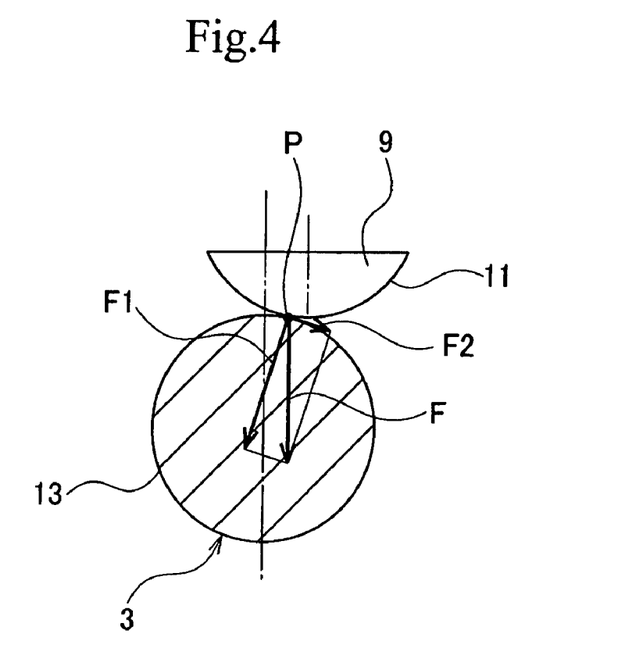
FIG. 4 It is an enlarged sectional view showing the coil end of the valve spring in connection with the first turn of the element wire in a loaded state (First embodiment).

FIG. 1 is a side view showing a valve spring as a coil spring according to a first embodiment of the present invention, FIG. 2 is a plan view showing the same, FIG. 3 is an enlarged sectional view showing a coil end of the valve spring in connection with a first turn of an element wire in a free state, and FIG. 4 is an enlarged sectional view showing the coil end of the valve spring in connection with the first turn of the element wire in a loaded state.

The valve spring 1 shown in FIGS. 1 to 3 may be a valve spring arranged in, for example, an internal combustion engine. In the engine, the valve spring is installed between a spring retainer serving as a movable part and a mounting seat of a cylinder head serving as a stationary part.

The valve spring 1 is made of an element wire 3 wound in a coil shape from a first coil end 11 to a second coil end. The valve spring 1 is coiled at equal pitches and equal diameters between a stationary side 5 arranged on the mounting seat and a movable side 7 arranged on the spring retainer. The valve spring 1 may have unequal pitches or a non-cylindrical shape, and the element wire 3 may have a non-circular section such as an elliptic section.

Each turn of the valve spring 1 forms 360°. A coil end 11 has a tip 9. The coil end 11 extends for about 0.15 turns from the tip 9. The thickness of the coil end 11 gradually decreases toward the tip 9.

Just after the coil end 11, a first turn 13 of the element wire 3 starts. According to the first embodiment, as shown in FIG. 3, the coil end 11 is shifted in a diametral outer direction of the valve spring 1 by a horizontal shift "S" relative to the first turn 13, to form a vertical gap "t" in an axial direction of the valve spring 1 between the coil end 11 and the first turn 13 in a free state without load. Namely, the gap t is constituted from a gap between points on circumferences of the coil end 11 and first turn 13 crossing a line passing through centers of the coil end 11 and first turn 13 along the line. When a lift of an intake valve or a discharge valve becomes to a maximum height, i.e., when the valve spring 1 is compressed with a maximum amount, the coil end 11 comes in contact with the first turn 13 as shown in FIG. 4, to zero the gap t.

An allowable range of the shift S (i.e., acceptable amount of end spreading or end retracting) is equal to or smaller than ½ of the diameter of the element wire 3. According to the embodiment, a preferable range of the shift S is 0.2 mm to ⅓ of the diameter of the element wire 3. If the diameter of the element wire 3 is 4.1 mm, the shift S will be about 0.2 mm to 1.35 mm.

An allowable range of the gap t in an axial direction of the valve spring 1 (i.e., acceptable amount of gap opening) is more than 0.1 mm. According to the embodiment, the gap t is set in a preferable range of 0.2 mm to 2.0 mm.

An allowable range of the thickness T of the tip 9 is ⅐ to ½ of the diameter of the element wire 3. According to the embodiment, the thickness T of the tip 9 is set in a preferable range of ⅕ to ⅖ of the diameter of the element wire 3. If the diameter of the element wire 3 is 4.1 mm, the thickness T of the tip 9 is 0.82 mm to 1.64 mm.

In this way, the valve spring 1 has the gap t of 0.2 mm to 2.0 mm between the coil end 11 and the first turn 13 in a free state. With this configuration, the valve spring 1 including the coil end 11 and first turn 13 can be entirely processed by shot peening as well as the remaining part of the valve spring 1. The shot peening is carried out with steel particles whose diameters are properly selected for the gap t of 0.2 mm to 2.0 mm. The shot peening provides the coil end 11 and first turn 13 with required residual stress as well as the remaining part of the valve spring 1, thereby improving fatigue resistance of the valve spring 1.

When the valve spring 1 is compressed with a maximum amount as shown in FIG. 4, the coil end 11 comes in contact with the first turn 13 at a contact point P, and the gap t becomes zero. The first turn 13 receives a combination of torsional stress and Hertzian stress (contact stress). According to the first embodiment, the coil end 11 is shifted by S in a diametral outer direction of the valve spring 1 so that the contact point P on the first turn 13 is shifted in the diametral outer direction of the valve spring 1 to reduce the torsional stress on the first turn 13.

At the contact point P, load F acts in an axial direction of the valve spring 1. The load F is divided into a bearing force F1 and a sliding force F2. This results in reducing the bearing force between the coil end 11 and the first turn 13, thereby reducing the Hertzian stress on the first turn 13.

Even if the coil end 11 comes in contact with the first turn 13 in the maximum compressed state, the configuration of the first embodiment can prevent a fretting of the coil end 11 and improve the durability of the valve spring 1.

The gap t formed by shifting the coil end 11 in a diametral outer direction of the valve spring 1 relative to the first turn 13 is effective to eliminate excessive bending stress from acting on the coil end 11 and prevent a breakage of the coil end 11 even when the coil end 11 repeatedly comes in contact with the first turn 13 in the gap t. The thickness T of the tip 9 of the coil end 11 is set in the range of ⅕ to ⅖ of the diameter of the element wire 3, so that the coil end 11 and first turn 13 are free from breakage against bending stress acting on the coil end 11.

[Verification Test]

(Shot Peening Characteristic)

Figure 5:
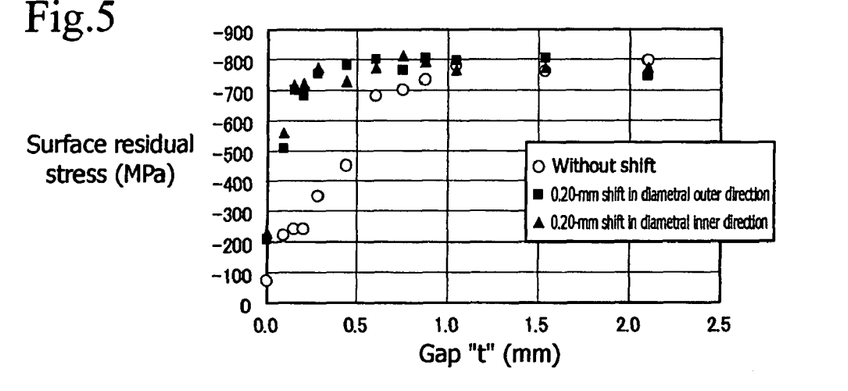
FIG. 5 It is a graph showing residual stress at 1.05th turn of coil springs after shot peening (First embodiment).

FIG. 5 is a graph showing residual stress in the 1.05th turn of each coil spring processed by shot peening. An abscissa represents a vertical gap t (mm) formed between a coil end (11) and a first turn (13) of each coil spring. An ordinate represents surface residual stress MPa in an element wire (3) between the coil end (11) and the first turn (13) of each coil spring. In FIG. 5, a white circle represents a coil spring with a coil end not shifted in a diametral outer or inner direction of the coil spring relative to a first turn. A black square represents a coil spring with a coil end (11) shifted by 0.20 mm in a diametral outer direction of the coil spring relative to a first turn (13). A black triangle represents a coil spring with a coil end (11) shifted by 0.25 mm in a diametral inner direction of the coil spring relative to a first turn (13).

In FIG. 5, the coil springs without a shift between a coil end and a first turn gradually increase surface residual stress in proportion to an increase in the gap t. The coil springs with a horizontal shift of 0.20 mm in a diametral outer direction of the coil springs or a horizontal shift of 0.25 mm in a diametral inner direction of the coil springs steeply increase surface residual stress up to a gap t of 0.1 mm, and then, stabilize the surface residual stress up to a gap t of 2.0 mm or over.

According to the first embodiment, the vertical gap t between the coil end 11 and the first turn 13 of the valve spring 1 is set in the range of 0.1 mm or more, preferably in the range of 0.2 mm to 2.0 mm in the free state. With this configuration, the valve spring 1 including the coil end 11 and first turn 13 can be entirely processed by shot peening as well as the remaining portion, to provide the coil end 11 and first turn 13 with a predetermined residual stress, thereby improving fatigue resistance of the valve spring 1.

(Strength Against Torsional Stress)

Figure 6:
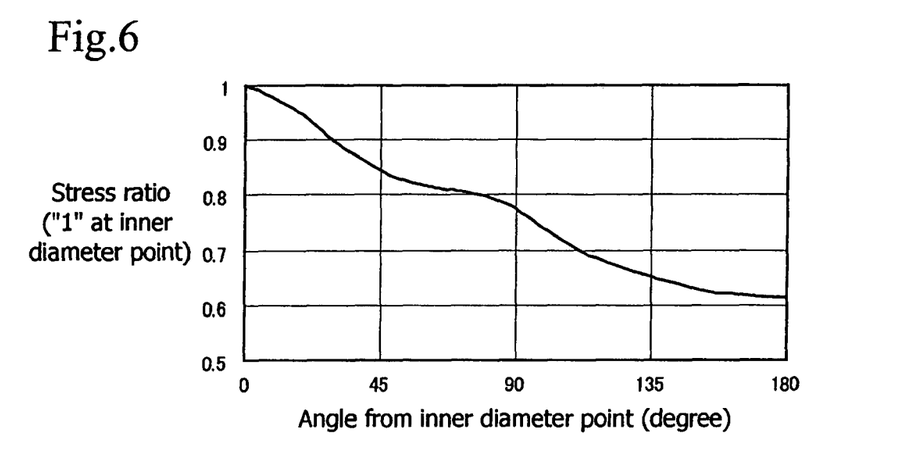
FIG. 6 It is a graph showing a distribution of circumferential stress of a coil spring having a circular cross-sectional shape (First embodiment).

FIG. 6 is a graph showing a distribution of circumferential stress of a coil spring having a circular sectional shape. An abscissa represents an angle (degrees) from an inner diametral point A in FIG. 3. An ordinate represents a stress ratio at an optional point with respect to the inner diametral point A. The inner diametral point A is at an angle of 0° and an outer diametral point B (FIG. 3) is at an angle of 180°. The stress ratio is based on the inner diametral point A being "1."

As is apparent in FIG. 6, circumferential stress is high on the inner diameter side and low on the outer diameter side of a coil spring. Accordingly, it is advantageous, in preventing a breakage of the first turn 13, to shift the coil end 11 in a diametral outer direction of the valve spring 1 relative to the first turn 13. On the other hand, in preventing a tip breakage of the coil end 11, it is advantageous to shift the coil end 11 in a diametral inner direction of the valve spring 1 relative to the first turn 13. This is because shifting the coil end 11 in a diametral inner direction of the valve spring 1 makes the first turn 13 restrict a displacement of the coil end 11 in a diametral outer direction of the valve spring 1. It is apparent in FIG. 6, the coil end 11 may be shifted in a diametral inner direction of the valve spring 1 by about 60°-position within about 30° to 90°-position as an influential angle in a breakage of the first turn 13, to prevent a breakage of the first turn 13 without excessively increasing torsional stress.

Figure 7:
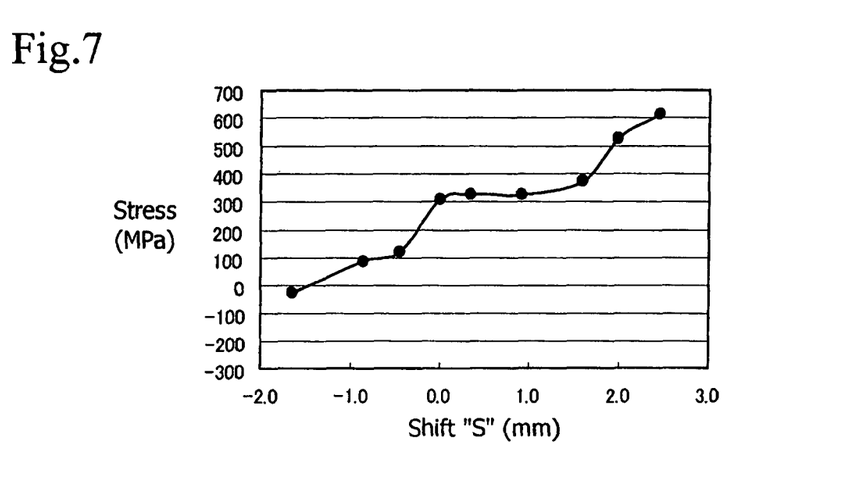
FIG. 7 It is a graph showing a distribution of circumferential stress of a coil spring having a circular cross-sectional shape (First embodiment).

FIG. 7 is a graph showing bending stress occurring at a 0.15th turn in a coil end (11) of a coil spring. An abscissa represents a horizontal shift S (mm) of the coil end from a first turn (13), and an ordinate represents bending stress MPa occurring at the 0.15th turn of the coil spring. On the abscissa of FIG. 7, positive values 1.0, 2.0, and 3.0 mm are on a diametral outer side relative to a first turn of a coil spring, negative values −1.0 and −2.0 mm are on a diametral inner side relative to the same.

In FIG. 7, the diameter of an element wire (3) of each coil spring is 4.1 mm. It is apparent in FIG. 7 that bending stress does not steeply increase from a no-shift position (0.0 mm) up to about a shift S of 2.0 mm, i.e., about ½ of the diameter of the element wire. Within this range, a breakage of a coil end (11) will not occur. It is preferable to set the horizontal shift S in the range of 0.2 mm to 4.1 mm (i.e., ⅓ of the diameter of the element wire 3).

(Thickness of the Tip)

Figure 8:
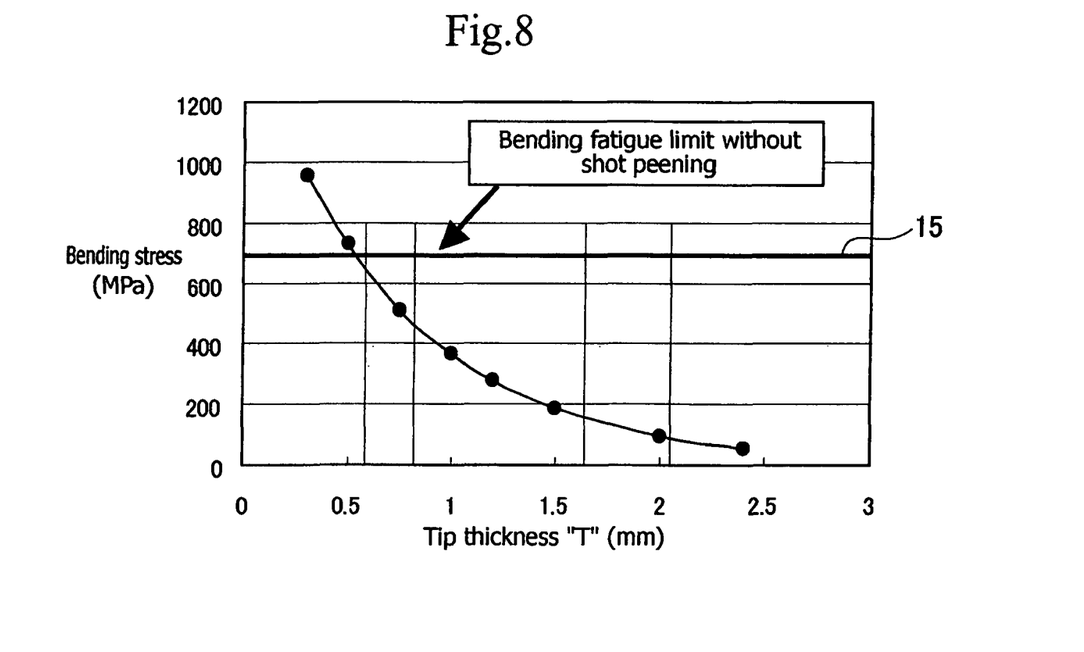
FIG. 8 It is a graph showing a relationship between bending stress and a thickness of a tip of a coil spring (First embodiment).
Figure 9:
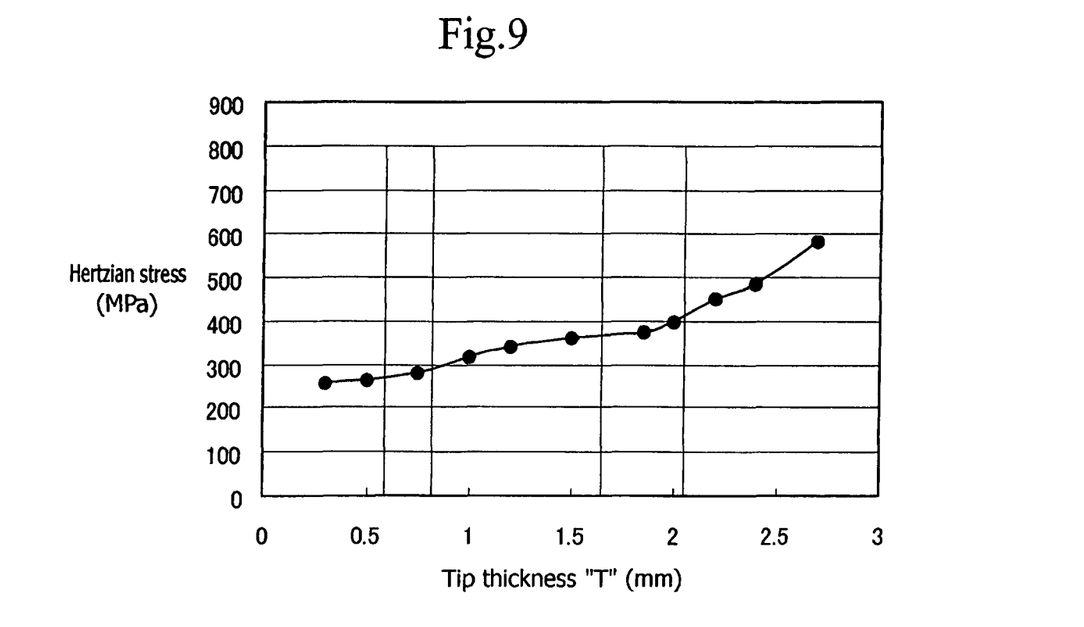
FIG. 9 It is a graph showing a relationship between Hertzian stress and the thickness of the tip (First embodiment).

FIG. 8 is a graph showing a relationship between the thickness T of a tip (9) of a coil spring and bending stress. An abscissa represents the thickness T (mm) of a tip (9) of a coil spring, and an ordinate represents bending stress MPa. FIG. 9 is a graph showing a relationship between the thickness T of a tip (9) of a coil spring and maximum Hertzian stress (contact stress) MPa. In FIG. 9, an abscissa represents the thickness T (mm) of a tip (9) of a coil spring, and an ordinate represents Hertzian stress MPa. In FIGS. 8 and 9, the diameter of an element wire (3) of each coil spring is 4.1 mm.

It is apparent in FIG. 8 of the thicker the thickness T the lower the bending stress Mpa and the thicker the thickness T the lower the risk of causing a tip breakage of a coil end (11). On the other hand, as is apparent from FIG. 9, the thicker the thickness T, the higher the Hertzian stress MPa. Namely, the thicker the thickness T the higher the risk of breaking a first turn (13).

In FIG. 8, a segment 15 represents a bending fatigue limit without shot peening. In order to suppress Hertzian stress and prevent breakages of a coil end (11) and a first turn (13) of the coil spring, a proper value for the thickness T of a tip (9) of a coil spring is selected under the segment 15 of FIG. 8 in view of above-mentioned matter. More precisely, the thickness T of a tip (9) of a coil spring is set in the range of ⅐ to ½, preferably ⅕ to ⅖ of the diameter of an element wire (3). The thickness T in such a range can prevent a breakage of a coil end and first turn of a coil spring against bending stress acting on the coil end.

(Dynamic Durability)

FIGS. 10(a) and 10(b) shows results of durability tests in which FIG. 10(a) is a list on coil springs related to shearing stress and FIG. 10(b) is a list on coil springs with an engine driven at high speed. Each tested coil spring has an element wire diameter d of 4.1 mm, a ratio D/d of 6.2 where D is a coil diameter and d is the element wire diameter, and the number of turns of 5.75.

In FIG. 10(a), shearing stress used in the tests of FIG. 10A is 686±637 MPa. In FIG. 10A, comparative examples 1 and 2 are coil springs of related art and have no horizontal shift "S" in a diametral outer or inner direction of the coil spring between a coil end and a first turn of the coil spring. In FIGS. 10(a) and 10(b), applied examples 1 to 25 are based on the first embodiment of the present invention and involve a horizontal shift "S" in a diametral outer or inner direction of the coil spring between a coil end and a first turn of the coil spring. In the applied examples 1 to 25, a shift with a plus "+" mark is a shift in a diametral outer direction of the coil spring and a shift with a minus "−" mark is a shift in a diametral inner direction of the coil spring.

In FIG. 10(a), the comparative examples 1 and 2 are earliest to break. The comparative example 1 breaks at 1.0th to 1.1 th turn of the coil spring after $5.32 \times 10^6$ times of application of the shearing stress, and the comparative example 2 breaks at 1.0th to 1.1 th turn of the coil spring after $7.25 \times 10^6$ times of application of the shearing stress. Each of the comparative examples 1 and 2 is unable to withstand $1 \times 10^7$ times of application of the shearing stress.

The applied examples 1 to 8 have vertical gaps "t" in the range of 0.2 mm to 2.0 mm, horizontal shifts "S" in the range of 0.2 mm to ⅓ of the element wire diameter, and a tip thickness T in the range of ⅕ to ⅖ of the element wire diameter. Each of the applied examples 1 to 8 withstands at least $5 \times 10^7$ times of application of the shearing stress. The applied examples 1 to 8 show an excellent durability improvement.

The applied examples 9 and 10 have horizontal shifts "S" of +1.55 mm (38% of the element wire diameter) and +1.80 mm (40% of the element wire diameter), respectively. These shifts are less than ½ of the element wire diameter. The applied example 9 causes a breakage at 0.15th to 0.25th turn after $3.53 \times 10^7$ times of application of the shearing stress, and the applied example 10 causes a breakage at 0.15th to 0.25th turn after $4.03 \times 10^7$ times of application of the shearing stress. The applied examples 9 and 10 resist $1 \times 10^7$ times of application of the shearing stress and show durability seven times greater than the comparative examples. The applied examples 9 and 10 show a high durability improvement.

The applied examples 11 and 12 have horizontal shifts "S" of +2.35 mm (57% of the element wire diameter) and −2.20 mm (−54% of the element wire diameter), respectively. These shifts are greater than ±½ of the element wire diameter. The applied example 11 causes a breakage at 0.15th to 0.3th turn after $9.32 \times 10^6$ times of application of the shearing stress. The applied example 12 causes a breakage at 1.0th to 1.2nd turn after $4.32 \times 10^6$ times of application of the shearing stress. The applied examples 11 and 12 show no durability improvement.

The applied example 13 has a horizontal shift "S" of −1.70 mm (41% of the element wire diameter) that is less than ½ of the element wire diameter. The applied example 13 causes a breakage at 1.0th to 1.1 st turn after $1.83 \times 10^7$ times of application of the shearing stress. The durability of $1.83 \times 10^7$ times is three times greater than the comparative examples 1 and 2, to show a high durability improvement.

The applied examples 14 to 16 have tip thicknesses T of 2.15 mm (52.4% of the element wire diameter), 2.25 mm (54.9% of the element wire diameter), and 2.10 mm (51.2% of the element wire diameter), respectively. Each of these thicknesses is greater than ½ of the element wire diameter. The applied example 14 causes a breakage at 1.0th to 1.15th turn after $5.85 \times 10^6$ times of application of the shearing stress. The applied example 15 causes a breakage at 1.0th to 1.2nd turn after $2.22 \times 10^6$ times of application of the shearing stress. The applied example 16 causes a breakage at 1.0th to 1.1 st turn after $7.82 \times 10^6$ times of application of the shearing stress. The applied examples 14 to 16 show no durability improvement.

The applied example 17 has a small vertical gap "t" of 0.10 mm and causes a breakage at 1.0th to 1.1 st turn after 2.31× $10^7$ times of application of the shearing stress. This durability is four times greater than the comparative examples 1 and 2, to show a high durability improvement.

The applied example 18 has a small vertical gap "t" of 0.15 mm and causes a breakage at 1.0th to 1.1st turn after 3.61×$10^7$ times of application of the shearing stress. This durability is six times greater than the comparative examples 1 and 2, to show a high durability improvement.

The test results of FIG. 10(b) will be studied. In the tests, each coil spring sample is set in an internal combustion engine, and the engine is driven at high speed. The applied example 19 has a tip thickness T of 0.55 mm (13.4% of the element wire diameter). The applied example 20 has a tip thickness T of 0.50 mm (12.2% of the element wire diameter). These thicknesses are lower than $1/7$ of the element wire diameter. The applied example 19 causes a breakage at 0.15th turn after 11 hours of the test. The applied example 20 causes a breakage at 0.15th turn after 10 hours of the test. The applied examples 19 and 20 show no durability improvement.

The applied example 21 has a tip thickness T of 0.65 mm (15.9% of the element wire diameter) that is greater than $1/7$ of the element wire diameter. The applied example 21 causes a breakage at 0.15th turn after 21 hours of the test. This durability is allowable, i.e., the applied example 21 shows a durability improvement.

The applied examples 22 to 25 have a vertical gap t in the range of 0.2 mm to 2.0 mm, a horizontal shift S lower than $1/2$ of the element wire diameter, and a tip thickness T in the range of $1/7$ to $1/2$ of the element wire diameter. Due to this, the applied examples 22 to 25 cause no breakage after 24 hours of the test.

In the consequence, a coil spring having a vertical gap t in the range of 0.1 mm to 2.0 mm, a horizontal shift S of smaller than $1/2$ of an element wire diameter, and a tip thickness T in the range of $1/7$ to $1/2$ of the element wire diameter is effective to prevent a breakage of a tip or a first turn of the coil spring in the dynamic tests of FIG. 10.

Effect of the First Embodiment

In the valve spring 1 according to the first embodiment, the coil end 11 is on the movable side 7. The coil end 11 is shifted in a diametral outer direction of the valve spring 1 relative to the first turn 13, to form the vertical gap t between the coil end 11 and the first turn 13 in a free state without load on the valve spring 1. Due to the gap t, the valve spring 1 including the coil end 11 and first turn 13 can be entirely processed by shot peening as well as the remaining portion.

The first turn 13 receives a combination of torsional stress and Hertzian stress. Since the coil end 11 that receives high Hertzian stress is shifted in a diametral outer direction of the valve spring 1 relative to the first turn 13, a contact point P (FIG. 4) on the first turn 13 is shifted in the diametral outer direction of the valve spring 1 to reduce the torsional stress on the first turn 13.

Load acting in an axial direction of the valve spring 1 is divided into a bearing force and a sliding force between the coil end 11 and the first turn 13 (FIG. 4). This results in reducing the bearing force between the coil end 11 and the first turn 13 and decreasing Hertzian stress on the first turn 13.

The coil end 11 is shifted from the first turn 13 in the diametral outer direction of the valve spring 1 to form the gap t, so that the coil end 11 and first turn 13 may repeatedly engage and disengage without applying excessive bending stress on the coil end 11 or without breaking the coil end 11.

Embodiment 2

[Coil Spring]

Figure 11:
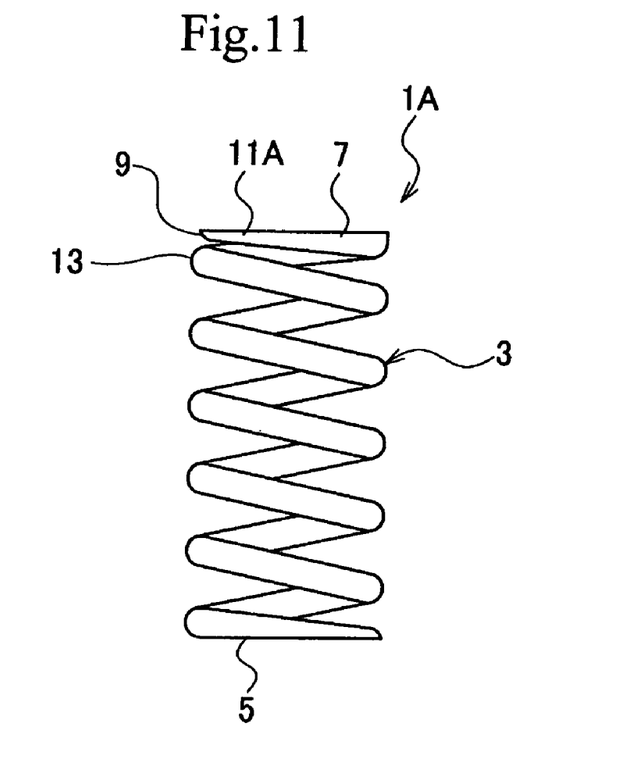
FIG. 11 It is a side view showing a valve spring (Second embodiment).
Figure 12:
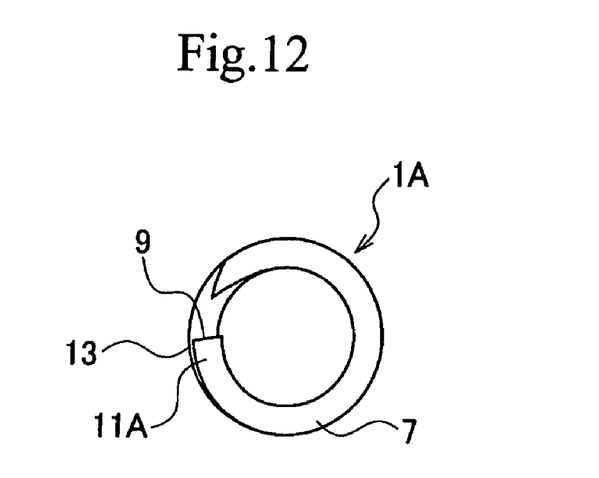
FIG. 12 It is a plan view showing the valve spring (Second embodiment).

FIGS. 11 and 12 show a valve spring according to a second embodiment in which FIG. 11 is a side view of the valve spring and FIG. 12 is a plan view of the same. The structure of the valve spring is basically the same as that of the first embodiment, and therefore, the same or corresponding parts are represented with the same marks or the same marks plus "A."

A valve spring 1A according to the second embodiment is made of an element wire 3 that includes a first turn 13 and a coil end 11A horizontally shifted by "S" from the first turn 13 in a diametral inner direction of the valve spring 1A, to form a vertical gap t in an axial direction of the valve spring 1A. The gap t is present in a free state with no load applied to the valve spring 1A. When a lift of an intake valve or a discharge valve becomes to a maximum height, i.e., when the valve spring 1A is compressed with a maximum amount, the coil end 11A is in contact with the first turn 13 to zero the gap t.

The horizontal shift S between the coil end 11A and the first turn 13 is set to be $1/2$ of the diameter of the element wire 3 or smaller. According to the second embodiment, the shift S is $1/3$ of the diameter of the element wire 3. If the diameter of the element wire 3 is 4.1 mm, the shift S is about 1.35 mm.

Effect of the Second Embodiment

In the valve spring 1A according to the second embodiment, the coil end 11A is shifted in a diametral inner direction of the valve spring 1A relative to the first turn 13, so that the gap t (reference to FIG. 3) is formed between the coil end 11A and the first turn 13 in a free state without load. With this configuration, the valve spring 1A including the coil end 11A and first turn 13 can be entirely processed by shot peening as well as the remaining portion.

Load acting in an axial direction of the valve spring 1A is divided into a bearing force and a sliding force between the coil end 11A and the first turn 13. This results in reducing the bearing force between the coil end 11A and the first turn 13 and decreasing Hertzian stress on the first turn 13.

The coil end 11A is shifted from the first turn 13 in the diametral inner direction of the valve spring 1A to form the gap t, so that the coil end 11A and first turn 13 may repeatedly engage and disengage without applying excessive bending stress on the coil end 11A or without breaking the coil end 11A.

[Other]

The coil springs of the above-mentioned embodiments are applicable not only for valves but also for other components such as clutches that receive dynamic load.

BRIEF DESCRIPTION OF THE DRAWINGS

FIG. 10 (a) is a list showing results of durability tests concerning shearing stress and (b) is a list showing results of durability tests with an engine driven at high speed (First embodiment).

DESCRIPTION OF NATIONS 1, 1A Valve springs
3 Element wire
7 Movable side
9 Tip
11, 11A Coil ends
13 First turn

The invention claimed is:

1. A coil spring, comprising:
an element wire that is coiled and which is receivable between a movable part and a stationary part, said element wire having a first end and a second end, said first end being engageable with the movable part and continuous to a first turn of the element wire, said first end having a pitch angle smaller than a corresponding pitch angle of the first turn of the element wire so as to gradually narrow a gap between said first end and the first turn in an axial direction of the coil spring;
said first end of the element wire being shifted in one of diametral inner direction or a diametral outer direction of the element wire relative to the first turn and having a portion that axially overlaps with the first turn and continuously extends from a base end portion starting to shift to a tip end portion of said first end, to secure a gap for shot peening between the first end and the first turn when the coil spring is in a free state without load.

2. The coil spring of claim 1, wherein a size of a gap in an axial direction of the coil spring is 0.1 mm or larger.

3. The coil spring of claim 2, wherein a size of the shift of the first end relative to the first turn is ½ of a diameter of the element wire or smaller.

4. The coil spring of claim 3, wherein a thickness of a tip of the first end is in a range of ⅕ to ½ of a diameter of the element wire.

5. A coil spring apparatus including the coil spring of claim 4, wherein:
the movable part is a spring retainer of a valve gear of an internal combustion engine; and
the stationary part is a mounting seat of a cylinder head of the internal combustion engine.

6. A coil spring apparatus including the coil spring of claim 3, wherein:
the movable part is a spring retainer of a valve gear of an internal combustion engine; and
the stationary part is a mounting seat of a cylinder head of the internal combustion engine.

7. The coil spring of claim 2, wherein a thickness of a tip of the first end is in a range of ⅕ to ½ of a diameter of the element wire.

8. A coil spring apparatus including the coil spring of claim 7, wherein:
the movable part is a spring retainer of a valve gear of an internal combustion engine; and
the stationary part is a mounting seat of a cylinder head of the internal combustion engine.

9. A coil spring apparatus including the coil spring of claim 2, wherein:
the movable part is a spring retainer of a valve gear of an internal combustion engine; and
the stationary part is a mounting seat of a cylinder head of the internal combustion engine.

10. The coil spring of claim 1, wherein a size of the shift of the first end relative to the first turn is ½ of a diameter of the element wire or smaller.

11. The coil spring of claim 10, wherein a thickness of a tip of the first end is in a range of ⅕ to ½ of a diameter of the element wire.

12. A coil spring apparatus including the coil spring of claim 11, wherein:
the movable part is a spring retainer of a valve gear of an internal combustion engine; and
the stationary part is a mounting seat of a cylinder head of the internal combustion engine.

13. A coil spring apparatus including the coil spring of claim 10, wherein:
the movable part is a spring retainer of a valve gear of an internal combustion engine; and
the stationary part is a mounting seat of a cylinder head of the internal combustion engine.

14. The coil spring of claim 1, wherein a thickness of a tip of the first end is in a range of ⅕ to ½ of a diameter of the element wire.

15. A coil spring apparatus including the coil spring of claim 14, wherein:
the movable part is a spring retainer of a valve gear of an internal combustion engine; and
the stationary part is a mounting seat of a cylinder head of the internal combustion engine.

16. A coil spring apparatus including the coil spring of claim 1, wherein:
the movable part is a spring retainer of a valve gear of an internal combustion engine; and
the stationary part is a mounting seat of a cylinder head of the internal combustion engine.

17. The coil spring of claim 1, wherein the element wire is coiled at equal pitches and equal diameters between the first and second ends thereof.

* * * * *